US008499427B2

(12) United States Patent
Wallek

(10) Patent No.: US 8,499,427 B2
(45) Date of Patent: *Aug. 6, 2013

(54) EXPANSION ANCHOR SETTING APPARATUS

(75) Inventor: Thomas Allan Wallek, Reno, NV (US)

(73) Assignee: Thomas Allan Wallek, Reno, NV (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/807,612

(22) Filed: Sep. 9, 2010

(65) Prior Publication Data

US 2011/0030184 A1 Feb. 10, 2011

Related U.S. Application Data

(63) Continuation of application No. 12/009,237, filed on Jan. 17, 2008, now Pat. No. 7,814,631.

(60) Provisional application No. 60/881,647, filed on Jan. 22, 2007.

(51) Int. Cl.
*B23P 11/02* (2006.01)

(52) U.S. Cl.
USPC ......... 29/254; 29/235; 29/271; 254/134.3 F T

(58) Field of Classification Search
USPC ................... 29/254, 255, 244, 263, 271, 272, 29/280, 283, 275; 227/147; 173/1, 29, 90, 173/91; 279/145
See application file for complete search history.

(56) References Cited

U.S. PATENT DOCUMENTS

| | | | | |
|---|---|---|---|---|
| 4,867,249 | A * | 9/1989 | Watkins et al. | 173/29 |
| 4,890,779 | A * | 1/1990 | Giannuzzi | 227/139 |
| 6,886,228 | B1 * | 5/2005 | Chen | 29/263 |
| 7,814,631 | B2 * | 10/2010 | Wallek | 29/254 |
| 8,061,000 | B2 * | 11/2011 | Santamarina et al. | 29/275 |
| 8,151,425 | B2 * | 4/2012 | Cossart | 29/281.1 |
| 2008/0173141 | A1 * | 7/2008 | Wallek | 81/177.1 |
| 2010/0122445 | A1 * | 5/2010 | Cossart | 29/281.6 |
| 2011/0030184 | A1 * | 2/2011 | Wallek | 29/283.5 |

* cited by examiner

*Primary Examiner* — Lee D Wilson

(57) ABSTRACT

Objects of the present invention provide an attachment for power tools that places and sets expansion anchors. One embodiment of the present invention is directed to a new and improved attachment apparatus for a rotary-hammer type drill, the attachment including a first anchor setting end, a second attachment end, and a handle portion connecting the setting end to the attachment end. The attachment apparatus can be efficiently and easily mounted to the rotary-hammer type drill to simplify the installation of expansion anchors.

16 Claims, 2 Drawing Sheets

EXPANSION ANCHOR SETTING APPARATUS

CROSS-REFERENCE TO RELATED APPLICATIONS

This application is a continuation of prior application Ser. No. 12/009,237, filed Jan. 17, 2008, entitled EXPANSION ANCHOR SETTING APPARATUS, which claims priority from provisional application Ser. No. 60/881,647, filed Jan. 22, 2007, the contents of which are incorporated herein by reference.

FIELD OF INVENTION

This invention relates to an expansion anchor setting apparatus, and more particularly, to an attachment for power tools that places and sets expansion anchors.

BACKGROUND

Power tools are conventionally used in the installation of anchors in substantially rigid materials. One well-known use of these power tools is in the installation process of expansion anchors in concrete, masonry, and rock. When such an anchor is placed, a power tool is used in a rotary hammer manner to impart combined rotational and axial impact blows to a particular area of the material. This is typically accomplished with a rotary hammer drill using a drilling bit structured for drilling in such material. When a sufficiently sized hole has been drilled out of the rigid material, the rotary hammer drill is set aside and the anchor is placed and set. The common practice within the construction industry for placing and setting the anchor is to use a handheld hammer and setting tool to push the expansion anchor into the drilled hole and then drive the expansion slug back into the expansion portion of the anchor by placing one end of the setting tool on the anchor and manually hammering the other side of the setting tool. This is a labor-intensive effort and is somewhat dangerous and difficult especially when attempting to install anchors overhead off of ladders. This can be especially difficult if the anchor is being placed in a ceiling portion as the need to look up can impair an operator's balance and orientation.

As mentioned above, expansion anchor setting tools are the most widely used tools for setting expansion anchors. They are typically constructed of metal with a handle that has a striking portion and a setting portion at opposing ends. U.S. Pat. No. 5,533,660 ("the '660 patent") describes such an expansion anchor setting tool with the addition of a rubberized portion for protection of the hand while hammering. However, although the tool disclosed in the '660 patent may help prevent the striking of an operator's hand, it still requires the operator to set aside the rotary hammer drill, balance themselves, and manually hammer the expansion anchor to set it. In addition to the physical demands imparted by this manual hammering, it can be extremely difficult to set such anchors where the working area is constrained and limited area exists for the workman to both hold the setting tool and swing the hammer.

Additionally, to achieve a high quality of attachment of the expansion anchor to the concrete or masonry structure, it is necessary that the expansion slug be adequately driven into the expansion region of the anchor. This is necessary to assure the performance margins of the anchor are attained. Such margins can only be achieved when the expansion slug is properly positioned. Each size of expansion anchor requires a setting tool specifically designed to drive the expansion slug to the proper depth to achieve the performance margins.

Larger expansion anchors require considerably more energy and force to properly position the expansion slug in the expansion anchor. This increases the difficulty of installation in difficult conditions and anchor failure often occurs because of inadequate installation.

Therefore, as already stated, the movement and placement of the expansion slug is necessary for the proper performance of the expansion anchor. The current practice and method of installing expansion anchors is physically exhausting and dangerous, especially when accomplished while working from ladders or overhead, the location where this type of anchor is most often used. These and other problems in the conventional art are addressed by embodiments of the present invention.

SUMMARY

Embodiments of the present invention provide an attachment for power tools that places and sets expansion anchors. In one embodiment, the expansion anchor setting attachment includes a first end structured to correspond to a setting portion of an expansion anchor, a second end structured to correspond with the receiving chuck of a power tool, and a handle portion connecting the first end to the second end. The handle portion may further include a sliding portion that is arranged to extend over at least a portion of the first end to stabilize an expansion anchor placed on the first end.

BRIEF DESCRIPTION OF DRAWINGS

These and other features and advantages of the present invention are best understood by reading the following detailed description, taken together with the drawings wherein.

DETAILED DESCRIPTION

Figure 1:
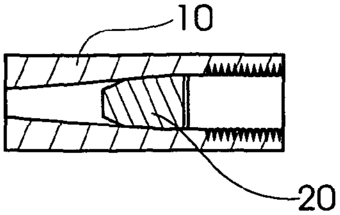
FIG. 1 is a partial cross-sectional view of a conventional concrete expansion anchor with the expansion slug.

As discussed above, it is recognized that there is a need to hold the anchor onto the end of setting device, freeing one of the workers hands so that he can maintain his balance and physical control while working from a ladder or overhead. Being able to free one hand has its obvious advantages, but none greater then the safety of the workman. The labor associated with using a mechanical installation method for expansion anchors allows for increased production with less energy expended by the worker. Safety of the worker is greatly improved. Accidents and costs associated with injuries have become a large issue in the construction industry. Profitability is enhanced by instituting practices and methods that improve working conditions. Though this may seem like a small matter, hundreds of millions of these types of anchors are installed globally each year. An improved installation method is long overdue and desired by the workman.

To address these and other problems, embodiments of the present invention are directed to an attachment for power tools that places and sets expansion anchors. Some of these embodiments are described below in detail, and in addition, some specific details are shown for purposes of illustrating the inventive principles. However, numerous other arrangements may be devised in accordance with the inventive principles of this patent disclosure. Thus, while the present invention is described in conjunction with the specific embodiments illustrated in the drawings, it is not limited to these embodiments or drawings. Rather, it is intended to cover alternatives, modifications, and equivalents that come within the scope and spirit of the inventive principles set out in the appended claims. Further, well-known processes have not been described in detail in order not to obscure the present invention. Thus, the inventive principles are not limited to the specific details disclosed herein.

One embodiment of the present invention is an attachment for a rotary-hammer drill. The attachment may be installed on the rotary-hammer drill after the hole to receive the expansion anchor has been drilled. This may necessitate the removal of the drill bit and installation of the setting tool. In another embodiment of the present invention, the setting tool may have the additional advantage of holding the anchor within its sliding receiver for ease of installation vertically and horizontally. The sliding receiver stabilizes the anchor so that the anchor can easily be installed in the previously drilled hole. This method of installation allows the workman to keep one hand free once the anchor has been placed within the sliding receiver.

Another object and advantage of this embodiment is that the setting tool can spin freely in the rotary drill position without damaging the threads of the anchor.

Another object of the present invention is the provision of a new and improved attachment apparatus for a rotary-hammer type drill and methods of use for the attachment apparatus with rotary-hammer type drills, where the attachment apparatus can be efficiently and easily mounted to the drill to simplify the installation of expansion type anchors.

FIG. 1 is a partial cross-sectional view of a conventional concrete expansion anchor with the expansion slug. Referring to FIG. 1, the expansion anchor 10 includes an expansion slug 20, a threaded portion 15, and an expansion portion 25. In a typical setting application, the expansion anchor 10 is placed in a predrilled hole that has substantially the same diameter as the expansion anchor 10. After placement, a setting tool is inserted in the threaded portion 15. The driving end of the setting tool that is inserted into the threaded portion 15 may have a diameter that is smaller than the diameter of the threaded portion 15 of the expansion anchor 10 so that the threads of the threaded portion 15 are not damaged during a subsequent expansion operation.

To expand the expansion anchor 10 to secure it in the predrilled hole, an expansion operation is carried out by which the driving end of the setting tool is repeatedly pushed against the expansion slug 20 such that the expansion slug 20 is driven into the expansion portion 25 of the expansion anchor 10. As the expansion slug 20 is displaced into the expansion portion 25 of the expansion anchor 10, the expansion portion 25 expands to secure the expansion anchor 10 in the predrilled hole. This occurs in part because the expansion portion 25 has a slot with an incrementally decreasing cross-sectional area such that when the expansion slug 20 enters the slot, the walls of the expansion portion 25 of the expansion anchor 10 radially expand.

Figure 2:
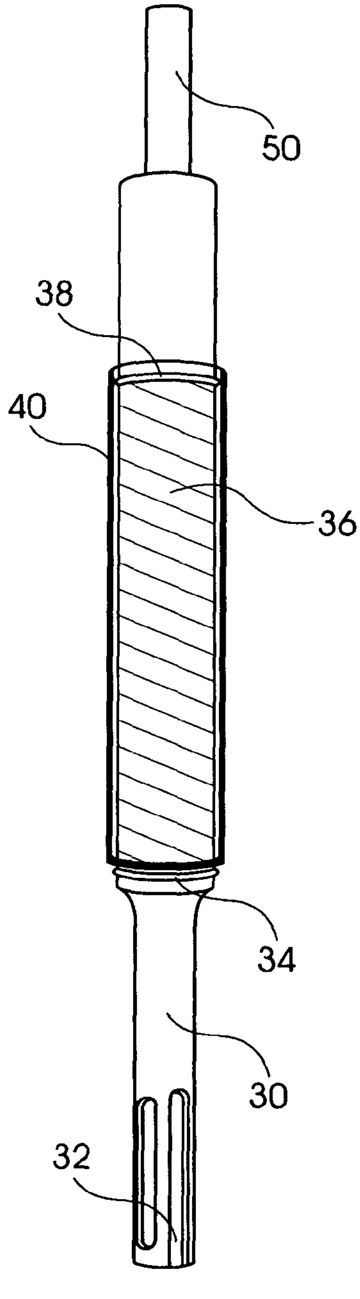
FIG. 2 is a partial cross-sectional view of a setting apparatus with a sliding receiver in a first position according to an embodiment of the present invention.
Figure 3:
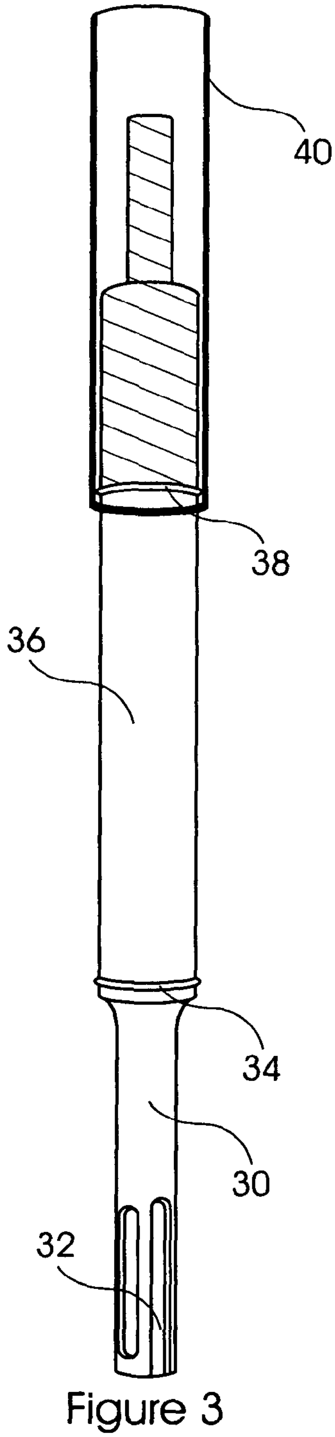
FIG. 3 is a partial cross-sectional view of the setting apparatus illustrated in FIG. 2 with the sliding receiver in a second position.

FIGS. 2 and 3 show cross-sectional views of a setting apparatus according to an embodiment of the present invention. FIG. 2 is a partial cross-sectional view of the setting apparatus with a sliding receiver in a first position and FIG. 3 is a partial cross-sectional view of the setting apparatus with the sliding receiver in a second position.

Referring to FIGS. 2 and 3, the setting apparatus 30 includes a driving end 50, an attachment end 32, and a handle portion 36 connecting the driving end 50 to the attachment end 32. The driving end 50 may be structured to have a diameter that is smaller than the diameter of the threaded portion of an expansion anchor, as mentioned above and shown in FIGS. 4 and 5. The actual diameter of the driving end 50 may be varied between setting apparatuses so that a variety of different sized expansion anchors may be set. In other embodiments, the driving end 50 may be expandable so that one setting apparatus 30 may be used on a variety of different sized expansion anchors. One embodiment of such a structure may include a plurality of driving tips that fit within one another such that an operator may place or remove one or more of the tips to obtain a driving end 50 that corresponds to a desired expansion anchor. The driving end 50 may further be constructed of a hardened metal to withstand the repeated impacts on expansion slugs in expansion anchors. Additionally, the length of the driving end 50 of the setting apparatus 30 may be of a particular pre-determined length so as not to over drive the expansion slug 20 deeper than is appropriate for a proper setting of the expansion anchor 10.

The attachment end 32 of the setting apparatus 30 is structured to fit with a chuck system of a power tool, such as a rotary-hammer drill or the like so that the setting apparatus can be securely held by the power tool. The attachment end 32 may include various indentations or protrusions to fit with any standardized chuck system used with power tools.

The handle portion 36 of the setting apparatus 30 connects the driving end 50 to the attachment end 32. The handle portion 36 may further include a sliding receiver 40 that moves back and forth along the longitudinal axis of the setting apparatus 30 with movement limited by a first retaining ring 34 for the full back position and a second retaining ring 38 for the full forward position (shown in FIG. 3). The sliding receiver 40 slides along the longitudinal axis of the setting apparatus 30 and may be held in position by friction with the second retaining ring 38. The first and second retaining rings 34 and 38 rest in slots cut in the shaft of the setting apparatus 30 at appropriate positions to allow for full movement of the sliding receiver 40. The sliding receiver 40 may further slide forward and back with enough friction between the second retaining ring 38 and the sliding receiver 40 to maintain any position along its range of movement. This feature may help to accomplish the objective of holding an expansion anchor prior to inserting the expansion anchor into the pre-drilled hole in the substrate.

In other embodiments, the handle portion 36 of the setting apparatus 30 may include only a metal shaft integrally connecting the driving end 50 to the attachment end 32. In other embodiments, the handle portion 36 may include a rotational receiver similar to the sliding receiver 40 shown in FIGS. 2 and 3, but without the sliding feature. That is, the rotational receiver may be held in one position while the shaft of the setting apparatus 30 freely rotates beneath it.

Figure 4:
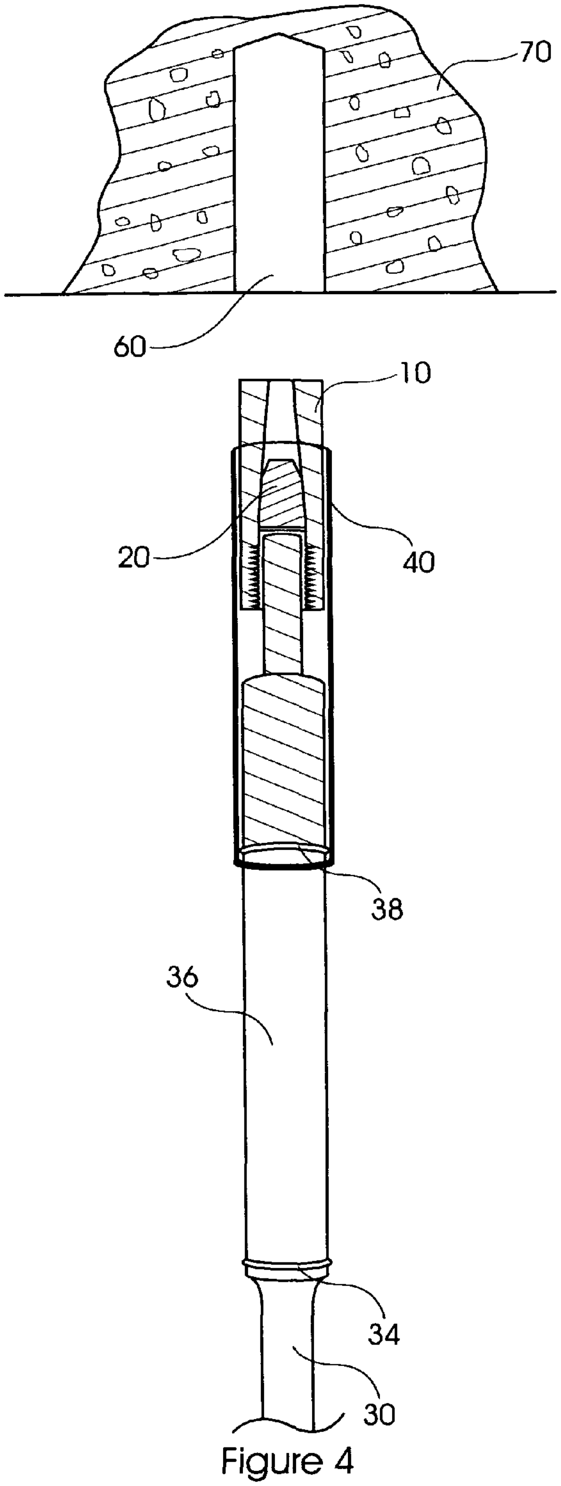
FIG. 4 is a partial cross-sectional view of the setting apparatus illustrated in FIG. 2 as installed in a rotary-hammer drill with an expansion anchor placed in the sliding receiver and ready for insertion in a pre-drilled substrate.
Figure 5:
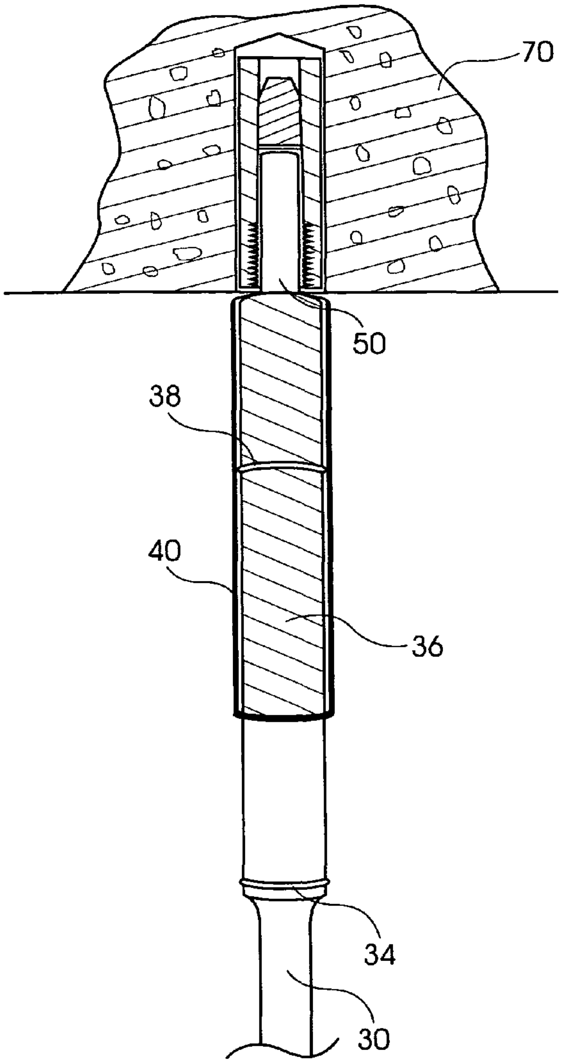
FIG. 5 is a partial cross-sectional view of the setting apparatus illustrated in FIG. 4 with the expansion anchor installed in the substrate.

FIGS. 4 and 5 illustrate the setting apparatus 30 shown in FIGS. 2 and 3 as installed in a rotary-hammer drill with an expansion anchor placed in the sliding receiver. FIG. 4 is a partial cross-sectional view of the setting apparatus as installed in a rotary-hammer drill with an expansion anchor placed in the sliding receiver and ready for insertion in a pre-drilled substrate and FIG. 5 is a partial cross-sectional view of the setting apparatus with the expansion anchor installed in the substrate.

Referring to FIGS. 4 and 5, a hole 60 is drilled in a substrate 70 using a rotary-hammer drill and drill bit. The drill bit is then removed and the setting apparatus 30 is installed and secured in the rotary-hammer drill (not shown). The sliding receiver 40 is positioned forward to the full forward position as shown in FIG. 3. The expansion anchor 10 is placed within the sliding receiver 40 as shown in FIG. 4. The expansion anchor 10 is then placed into the pre-drilled hole 60 with the setting apparatus 30 and pushed to the back of the pre-drilled hole 60 with the setting apparatus 30. As shown in FIG. 5, when the expansion anchor 10 is pushed back into the pre-drilled hole 60, the sliding receiver 40 retracts to the surface of the substrate 70. The rotary-hammer drill (not shown) is then turned on and pressure is applied to the expansion anchor slug 20. The mechanical action of the rotary-hammer drill drives the expansion anchor slug 20 fully into the expansion portion 25 of the expansion anchor 10. When the expansion anchor slug 20 is fully set as shown in FIG. 5, the setting apparatus 30 is withdrawn from the anchor and the installation of the expansion anchor 10 is complete. After the setting apparatus 30 has been removed, bolts or other mechanical fasteners (not shown) may be screwed into the threaded portion 15 of the installed expansion anchor 10.

Although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention.

What is claimed is:

1. An expansion anchor setting apparatus, comprising:
a driving shaft including
a body portion,
a first end having a cross-sectional area smaller than a cross-sectional area of the body portion to correspond to a setting portion of an expansion anchor, and
a second end structured to correspond with a receiving chuck of a power tool; and
a sliding sleeve coupled to the driving shaft and configured to move longitudinally along the driving shaft between a first stop position that covers at least a portion of the first end of the driving shaft and a second stop position that exposes the first end of the driving shaft.

2. The apparatus of claim 1, wherein the sliding sleeve is configured to support an expansion anchor positioned on the first end of the driving shaft when displaced at the first stop position.

3. The apparatus of claim 2, further comprising a first retaining device configured to prevent the sliding sleeve from sliding past the first stop position.

4. The apparatus of claim 3, further comprising a second retaining device configured to prevent the sliding sleeve from sliding past the second stop position.

5. The apparatus of claim 4, wherein the first and second retaining devices are retaining rings that respectively correspond to first and second indentations in the body portion of the driving shaft.

6. The apparatus of claim 1, wherein the sliding sleeve is configured to engage the body portion of the driving shaft to produce friction sufficient to maintain the position of the sliding sleeve relative to the body portion.

7. The apparatus of claim 1, wherein the first end is configured to fit within a threaded portion of an expansion anchor and engage an expansion slug positioned in the expansion anchor.

8. The apparatus of claim 7, wherein a length of the portion of the first end having the smaller cross-sectional area corresponds to the depth the expansion slug needs to be positioned in the expansion anchor to set the expansion anchor.

9. The apparatus of claim 1, wherein the first end includes a plurality of driving end tips.

10. The apparatus of claim 9, wherein at least two of the plurality of driving end tips include different sized cross-sectional areas that correspond to different sized expansion anchors.

11. The apparatus of claim 10, wherein the plurality of driving tips nest within each other from a largest-sized driving tip to a smallest-sized driving tip.

12. The apparatus of claim 9, wherein the plurality of driving end tips respectively fit over a portion of the first end of the apparatus.

13. The apparatus of claim 1, wherein the second end includes indentations corresponding to a fastening system of the receiving chuck of the power tool.

14. The apparatus of claim 13, wherein the second end is configured to correspond to the receiving chuck of a rotary-hammer drill.

15. An expansion anchor setting apparatus, comprising:
a driving shaft including
a body portion,
a first end having a cross-sectional area smaller than a cross-sectional area of the body portion, and
a second end structured to correspond with a receiving chuck of a power tool;
a plurality of driving tips that fit over the first end of the driving shaft, where each of the plurality of driving tips are configured to correspond to different sized expansion anchors; and
a sliding sleeve coupled to the driving shaft and configured to move longitudinally along the driving shaft between a first stop position that covers at least a portion of the first end of the driving shaft and a second stop position that exposes the first end of the driving shaft.

16. An expansion anchor setting apparatus, comprising:
a substantially cylindrical shaft, the shaft including:
a body portion including a first substantially circular slot and a second substantially circular slot spaced apart from the first slot by a predetermined distance,
a driving end having a cross-sectional area smaller than a cross-sectional area of the body portion, the driving end configured to fit within a threaded portion of an expansion anchor to engage an expansion slug, and
an attachment end configured to be engaged by a receiving chuck of a rotary-hammer drill, the attachment end being positioned opposite the driving end with the body portion being interposed there between;
a sliding sleeve covering at least a section the body portion of the shaft, the sliding sleeve configured to cover at least a portion of the driving end to support an expansion anchor disposed on the driving end of the apparatus in a first slide position and configured to expose the driving end of the apparatus in a second slide position, wherein the sliding sleeve engages the shaft to maintain the position of the sliding sleeve relative to the shaft;
a first retaining ring positioned in the first slot in the body portion of the shaft, the first retaining ring configured to prevent the sliding sleeve from sliding past the first slide position; and a second retaining ring positioned in the second slot in the body portion of the shaft, the second retaining ring configured to prevent the sliding sleeve from sliding past the second slide position.

* * * * *